United States Patent
Imata

(10) Patent No.: US 7,305,083 B2
(45) Date of Patent: Dec. 4, 2007

(54) ECHO CANCELLER

(75) Inventor: Masanori Imata, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/141,793

(22) Filed: May 31, 2005

(65) Prior Publication Data

US 2005/0265544 A1    Dec. 1, 2005

Related U.S. Application Data

(63) Continuation of application No. 10/354,666, filed on Jan. 30, 2003, now Pat. No. 6,934,386.

(30) Foreign Application Priority Data

Jan. 20, 2003 (JP) .............................. 2003-010511

(51) Int. Cl.
*H04M 1/00* (2006.01)

(52) U.S. Cl. .................... 379/406.05; 379/406.06; 379/406.07; 379/406.11

(58) Field of Classification Search ........... 379/406.05, 379/406.06, 406.07, 406.11
See application file for complete search history.

(56) References Cited

U.S. PATENT DOCUMENTS 6,760,436 B1    7/2004  Takada .................. 379/406.01
6,961,422 B2 *  11/2005  Boland ................. 379/406.05

* cited by examiner

*Primary Examiner*—Jefferey F Harold
(74) *Attorney, Agent, or Firm*—Frommer Lawrence & Haug LLP; William S. Frommer; Thomas F. Presson

(57) ABSTRACT

An echo canceller used in a vocal information exchange system operates in such a circumstance that a sound wave released by a speaker is picked up by a microphone unintentionally and works to suppress an echo signal included in the audio signal produced by the microphone by using a pseudo echo signal which is produced based on the incoming audio signal to be fed to the speaker and produce a subtracted audio signal which becomes the outgoing audio signal, with the echo signal being suppressed based on the accurately-calculated degree of echo suppression achieved by use of the pseudo echo signal.

3 Claims, 9 Drawing Sheets

ECHO CANCELLER

This application is a Continuation of U.S. application Ser. No. 10/354,666, filed Jan. 30, 2003, now U.S. Pat. No. 6,934,386 now pending, which is hereby incorporated by reference in its entirety herein.

BACKGROUND OF THE INVENTION

1. Field of the Invention

The present invention described in the appended claims of this patent application relates to an echo canceller which operates in such a circumstance that a sound wave released by a signal/sound transducing means (e.g., speaker) happens to be picked up by a sound/signal transducing means (e.g., microphone) and works to suppress an echo signal in an audio signal produced by the sound/signal transducing means, and also relates to a line echo canceller which eliminates an electrical echo arising on a communication line.

2. Description of Related Art

In a telephone conference system or television conference system for exchanging vocal information among user terminals, a speaker as signal/sound transducing means and a microphone as sound/signal transducing means of each terminal are placed to have a sort of acoustic coupling with each other. Therefore, a sound wave released by the speaker is picked up by the microphone unintentionally.

A sound wave released by a speaker and picked up by a microphone becomes an adverse echo signal in an audio signal produced by the microphone. If the audio signal produced by the microphone includes such an echo signal, a resulting echo-added sound wave reproduced from this audio signal and released by a speaker of other user terminal will have a degraded sound quality in the performance of vocal information exchange for example.

To cope with the matter that a sound wave released by a speaker is picked up by a microphone unintentionally, there has been proposed the provision of a pseudo echo signal generator which produces a pseudo echo signal based on the audio signal to be fed to the speaker so that the echo signal included in the audio signal produced by the microphone is cancelled out by the pseudo echo signal produced by the pseudo echo signal generator. (Refer to the following non-patent publication #1, non-patent publication #2, and patent publication #1, for example).

In a conventional vocal information exchange system with the ability of echo suppression, as shown for example in FIG. 7, a microphone 11 and a speaker 12 are so located that a sound wave released by the speaker 12 happens to be picked up by the microphone 11 (indicated by the dashed-line arrow), and an incoming audio signal Ss which is introduced through a receiver 13 is fed to the speaker 12 by being amplified by an audio signal amplifier 14 and also put in to a pseudo echo signal generator 15. The speaker 12 releases a sound wave which is reproduced from the incoming audio signal Ss.

The microphone 11 produces an audio signal Sm from a sound wave sensed by it, and the audio signal Sm includes an echo signal which is derived from a sound wave released by the speaker 12. The audio signal Sm is amplified by an audio signal amplifier 16 and put in to a subtracter 17.

The subtracter 17, which has another input of a pseudo echo signal Sei produced by the pseudo echo signal generator 15, subtracts the pseudo echo signal Sei from the audio signal Sm produced by the microphone 11, thereby suppressing the echo signal included in the audio signal Sm, and puts out a resulting subtracted audio signal Sma. The subtracted audio signal Sma is put in to a subsidiary echo suppressor 18 and also to the pseudo echo signal generator 15. Accordingly, the pseudo echo signal generator 15 produces the pseudo echo signal Sei based on both the incoming audio signal Ss to be fed to the speaker 12 and the subtracted audio signal Sma put out from the subtracter 17.

The subsidiary echo suppressor 18 further suppresses a residual echo signal included in the subtracted audio signal Sma put out from the subtracter 17 thereby to produce an outgoing audio signal Sma'. The outgoing audio signal Sma' is sent out by a transmitter 19.

The pseudo echo signal generator 15 is an adaptive filter which is arranged as shown in FIG. 8 for example. The adaptive filter is made up of: a delay circuit including unit delay elements of n in number that is larger than two 20(0), 20(1), 20(2), . . . , 20(n−2) and 20(n−1) which are connected in series to delay in steps the incoming audio signal Ss to be fed to the speaker 12; a factor generator 21 which produces factor signals h(0), h(1), h(2), . . . , h(n−2) and h(n−1) of n in number, which vary in response to the subtracted audio signal Sma put out from the subtracter 17; factor registers of n in number 22(0), 22(1), 22(2), . . . , 22(n−2) and 22(n−1) which hold the respective factor signals; multipliers of n in number 23(0), 23(1), 23(2), . . . , 23(n−2) and 23(n−1) which implement multiplication between delayed audio signals x(0), x(1), x(2), . . . , x(n−2) and x(n−1) put out from the respective unit delay elements and the factor signals h(0), h(1), h(2), . . . , h(n−2) and h(n−1) put out from the respective factor registers correspondingly; and a summing operator including adders of n−1 in number 24(1), 24(2), . . . , 24(n−2) and24(n−1) which sum the multiplication outputs y(0), y(1), y(2), . . . , y(n−2) and y(n−1) of the respective multipliers cumulatively.

The adders 24(1)-24(n−1) of the summing operator produce summation outputs z(1), z(2), . . . , z(n−2) and z(n−1), respectively, and the output z(n−1) of the last-stage adder 24(n−1) is released as the pseudo echo signal Sei. The pseudo echo signal Sei, i.e., summation output z(n−1), is the total of the multiplication outputs y(0)-y(n−1).

The factor generator 21 implements a learning-based revision process for the factor signals h(0)-h(n−1) based on the NLMS (Normarized Least Mean Square) algorithm for example. Specifically, the factor signals h(0)-h(n−1) are updated in accordance with the following formula (1).

$$h(i)(t)=h(i)(t-1)+\mu\cdot e\cdot x(i)/X\ (i=0, 1, 2\ldots, n-1) \tag{1}$$

In the formula, h(i)(t) represents a factor signal which is held at time t by the i-th factor register 22(i), h(i)(t−1) represents a factor signal which is held at time t−1 by the i-th factor register 22(i), μ is a revision factor which is larger than 0 and smaller than 2, e is the subtracted audio signal Sma, x(i) is a delayed audio signal put out from the i-th unit delay element 20(i), and x is the square-sum of the delayed audio signals x(0)-x(n−1).

In this vocal information exchange system with the ability of echo suppression, the subsidiary echo suppressor 18, which further suppresses a residual echo signal included in the subtracted audio signal Sma put out from the subtracter 17 thereby to produce an outgoing audio signal Sma', is a nonlinear processing means as described in the following non-patent publication #2 for example, which is designed to implement a nonlinear-wise level control process for the subtracted audio signal Sma thereby to alleviate the echo. It is necessary for this processing means to control the level of subtracted audio signal Sma accurately so that the vocal information signal carried by the subtracted audio signal Sma is not attenuated for the avoidance of the deterioration of quality of the sound wave which will be reproduced from the outgoing audio signal Sma' put out from the subsidiary echo suppressor 18.

A specific scheme of controlling the level of subtracted audio signal Sma by the nonlinear processing means as the subsidiary echo suppressor 18 for minimizing the deterioration of quality of the sound wave reproduced from the audio signal Sma' is to base the control on the degree of echo suppression by the pseudo echo signal Sei provided by the adaptive filter as the pseudo echo signal generator 15.

The conventional system employs an echo suppression degree calculator 25 as shown in FIG. 9 for assessing the degree of echo suppression achieved by use of the pseudo echo signal Sei produced by the adaptive filter as the pseudo echo signal generator 15. This echo suppression degree calculator 25 is made up of: a subtracted signal power calculator 26 which calculates power of the subtracted audio signal Sma put out from the subtracter 17 and produces a subtracted power signal Pma; an incoming signal power calculator 27 which calculates power of the incoming audio signal Ss to be fed to the speaker 12 and produces an incoming power signal Ps; and a division operator 28 which has inputs of the subtracted power signal Pma from the subtracted signal power calculator 26 and the incoming power signal Ps from the incoming signal power calculator 27.

The division operator 28 divides power of subtracted audio signal Sma indicated by the subtracted audio signal Sma with power of incoming audio signal Ss indicated by the incoming power signal Ps, thereby producing an echo suppression degree signal Ses indicative of the degree of echo suppression achieved by the adaptive filter as the pseudo echo signal generator 15. Namely, the degree of echo suppression by the pseudo echo signal Sei and indicated by the echo suppression degree signal Ses is derived from power of subtracted audio signal Sma divided by power of incoming audio signal Ss.

Non-patent publication #1: "Adaptive Signal Processing" written by B. Widrow and S. D. Stearns, published by Prentice-Hall in 1985.

Non-patent publication #2: ITU-T (TELECOMMUNICATION STANDARDIZATION SECTOR OF INTERNATIONAL TELECOMMUNICATION UNION) Recommendation G.165 (03/93), ECHO CANCELLERS.

Patent publication #1: Japanese Patent Unexamined Publication No. 56526/1986.

SUMMARY OF THE INVENTION

However, the degree of echo suppression by the pseudo echo signal Sei assessed in terms of power of subtracted audio signal Sma divided by power of incoming audio signal Ss and indicated by the echo suppression degree signal Ses is not accurate enough. Because, the subtracted audio signal Sma includes a vocal information signal to be transmitted and a residual echo signal and noise, and therefore the resulting inclusion of power of echo signal and noise in power of signal Sma is problematic in calculating the degree of echo suppression by the pseudo echo signal Sei as follows.

(1) If the subtracted audio signal Sma includes the vocal information signal and noise in large proportion relative to the residual echo signal, the degree of echo suppression is not calculated accurately. (2) A smaller incoming audio signal incurs a state of large proportion of the vocal information signal and noise relative to the residual echo signal in the subtracted audio signal Sma, and consequently the degree of echo suppression is not calculated accurately. (3) Power of subtracted audio signal Sma can have different values depending on the nature of sound carried by the incoming audio signal Ss even if power of incoming audio signal Ss is the same, and consequently the degree of echo suppression is not calculated accurately. (4) With the subtracted audio signal Sma lagging behind the incoming audio signal Ss, if power of signal Ss varies, calculation of the degree of echo suppression is liable to have error.

The level control process for the subtracted audio signal Sma by the nonlinear processing means as the subsidiary echo suppressor 18 based on the above-mentioned inaccurate evaluation of the degree of echo suppression by the adaptive filter will incur the following problems.

(1) In case the degree of echo suppression by the pseudo echo signal Sei is assessed to be smaller than actuality, the echo can possibly be aggravated despite the level control process for the subtracted audio signal Sma by the nonlinear processing means as the subsidiary echo suppressor 18. (2) In the case of a smaller assessment result of the degree of echo suppression by the pseudo echo signal Sei than actuality, if the level control for the subtracted audio signal Sma by the nonlinear processing means as the subsidiary echo suppressor 18 is intensified with the intention of alleviating the echo, it will incur the attenuation of the vocal information signal to be transmitting, resulting possibly in a degraded quality of sound wave reproduction based on the outgoing audio signal Sma'.

In view of the foregoing situations, the present invention described in the appended claims of this patent application is intended to provide an echo canceller which operates in such a circumstance that a sound wave released by a signal/sound transducing means such as a speaker happens to be picked up by a sound/signal transducing means such as a microphone and works to suppress an echo signal included in an audio signal produced by the sound/signal transducing means by using a pseudo echo signal which is produced based on an incoming audio signal to be fed to the signal/sound transducing means and produce a subtracted audio signal which becomes an outgoing audio signal, with the echo signal being suppressed based on the accurately calculated degree of echo suppression achieved by use of the pseudo echo signal.

An inventive echo canceller set forth in any of claim 1 through claim 4 comprises a subtracter which has an input of a first audio signal produced by a sound/signal transducing means; an adaptive filter which is made up of a delay circuit including a plurality of delay stages which delay in steps a second audio signal to be fed to a signal/sound transducing means which releases a sound wave which happens to be picked up by the sound/signal transducing means, a factor generator which produces a plurality of factor signals which vary in response to a third audio signal put out from the subtracter, a plurality of multipliers which implements multiplication between delayed audio signals put out from the delay stages and the factor signals correspondingly, and a first summing operator which sums multiplication outputs of the multipliers and puts a resulting pseudo echo signal in to the subtracter by which the pseudo echo signal is subtracted from the first audio signal so that an echo signal included in it is suppressed; and an echo suppression degree calculator which is made up of a plurality of squaring operators which implement squaring operations for individual factor signals that correspond to delayed audio signals put out from delay stages ranging from an intermediate through the last stage, and a second summing operator which sums squared signals put out from the squaring operators thereby to produce an echo suppression degree signal.

An inventive echo canceller set forth in claim 3 or claim 4, which is derived from the first-mentioned echo canceller made up of the subtracter, adaptive filter and echo suppression degree calculator, further includes a subsidiary echo suppressor which processes the third audio signal put out from the subtracter in response to the echo suppression degree signal produced by the echo suppression degree calculator thereby to suppress a residual echo signal included in the third audio signal.

An inventive echo canceller set forth in any of claim 1 through claim 4 includes a microphone as sound/signal transducing means and a speaker as signal/sound transducing means. The microphone has an output of a first audio signal, the speaker has an input of a second audio signal, an adaptive filter produces a pseudo echo signal based on the second audio signal, a subtracter subtracts the pseudo echo signal produced by the adaptive filter from the first audio signal produced by the microphone thereby to implement echo suppression based on the second audio signal and puts out a resulting third audio signal, the adaptive filter delays the second audio signal in steps by means of a plurality of delay stages and also generates factor signals, and an echo suppression degree calculator implements squaring operations for factor signals that correspond to delayed audio signals put out from an intermediate through the last delay stages and sums the squared signals thereby to produce the echo suppression degree signal.

The range of delay stages from an intermediate through the last stages which put out delayed audio signals to be used for producing the echo suppression degree signal by the echo suppression degree calculator is determined such that, for example, the impulse response of acoustic coupling between the speaker and the microphone having reverberation times equivalent to delay times of the intermediate delay stage through the last delay stage, i.e., power of the echo signal response included in the first audio signal from the microphone, is virtually equal to the impulse response of acoustic coupling between the speaker and the microphone having reverberation times in excess of the delay time at the last delay stage, i.e., power of the echo signal response included in the first audio signal from the microphone. Consequently, the echo suppression degree signal produced by the echo suppression degree calculator indicates accurately the echo suppression degree, which is achieved by use of the pseudo echo signal produced by the adaptive filter, for the first audio signal from the microphone.

An inventive echo canceller set forth in any of claim 1 through claim 4 operates on a subtracter to implement echo suppression for a first audio signal, which is produced by a microphone, based on a pseudo echo signal produced by an adaptive filter and put out a resulting third audio signal, and on an echo suppression degree calculator to calculate accurately the degree of echo suppression achieved by use of the pseudo echo signal.

An inventive echo canceller set forth in claim 3 or claim 4 operates on a subsidiary echo suppressor to process the third audio signal, which results from echo signal suppression by the subtracter for the first audio signal produced by the microphone, in response to an echo suppression degree signal calculated accurately by an echo suppression degree calculator for the degree of echo suppression achieved by use of the pseudo echo signal produced by the adaptive filter. Consequently, a residual echo signal included in the third audio signal is suppressed accurately and effectively.

Other and further objects, features and advantages of the invention will appear more fully from the following description.

DESCRIPTION OF THE PREFERRED EMBODIMENTS

Figure 1:
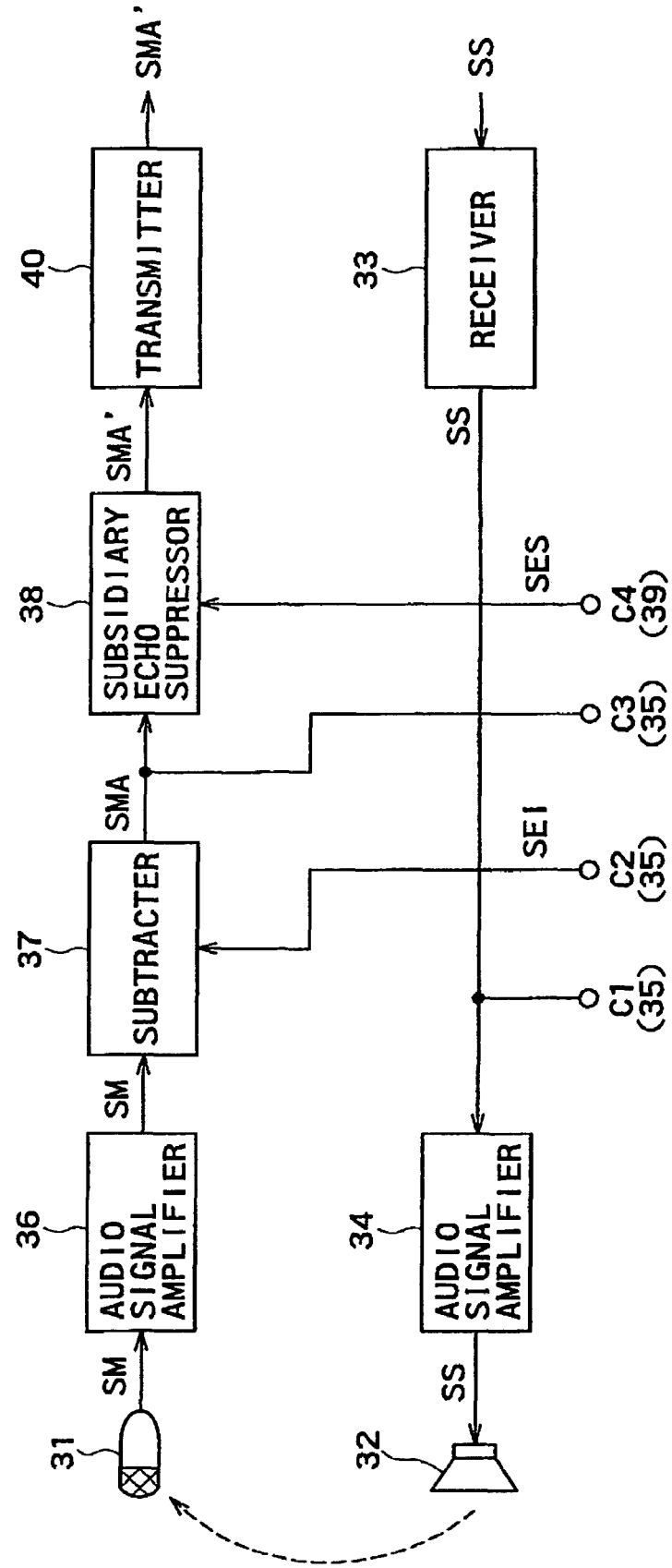
FIG. 1 is a block circuit diagram showing part of a vocal information exchange system, with an embodiment of echo canceller set forth in any of claim 1 through claim 4 being applied thereto.
Figure 2:
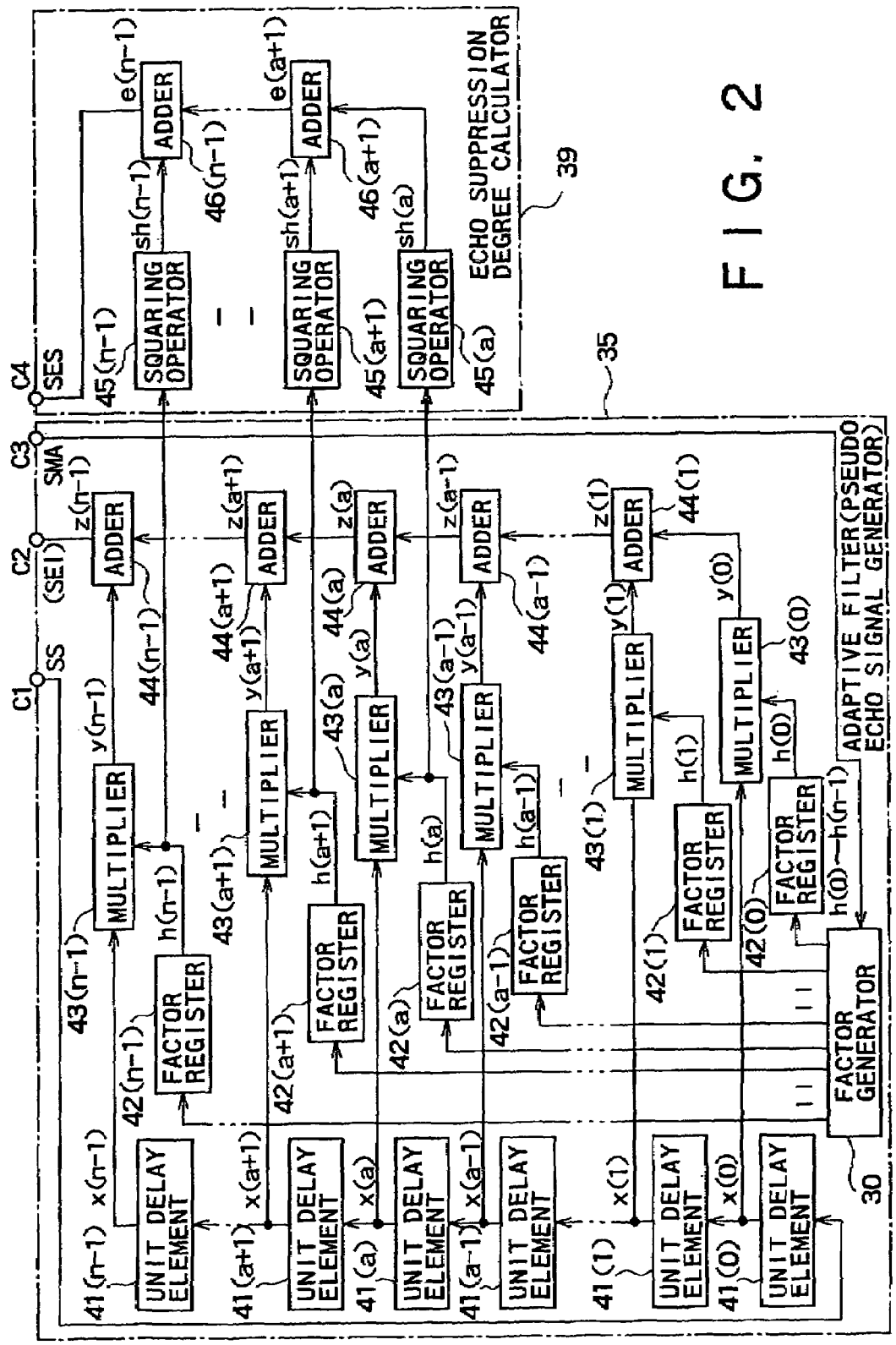
FIG. 2 is a block circuit diagram showing part of the vocal information exchange system, with an embodiment of echo canceller set forth in any of claim 1 through claim 4 being applied thereto.

FIG. 1 and FIG. 2 show portions of a vocal information exchange system, with embodiments of echo canceller set forth in any of claim 1 through claim 4 being applied thereto. The circuits shown in FIG. 1 and FIG. 2 are connected at the line ends indicated by C1, C2, C3 and C4.

In this system, a microphone 31 as sound/signal transducing means and a speaker 32 as signal/sound transducing means are so located that a sound wave released by the speaker 32 happens to be picked up by the microphone 31 (indicated by the dashed-line arrow), and an incoming audio signal SS which is introduced through a receiver 33 is fed to the speaker 32 by being amplified by an audio signal amplifier 34 and also put in to an adaptive filter 35 as pseudo echo signal generator. The speaker 32 releases a sound wave which is reproduced from the incoming audio signal SS.

The microphone 31 produces an audio signal SM from a sound wave sensed by it. Since the sound wave released by the speaker 32 is picked up by the microphone 31, there is a sort of acoustic coupling between the speaker 32 and microphone 31, causing the audio signal SM produced by the microphone 31 to include an echo signal resulting from the sound wave released by the speaker 32. The audio signal SM from the microphone 31 is amplified by an audio signal amplifier 36 and put in to a subtracter 37.

The subtracter 37, which has another input of a pseudo echo signal SEI produced by the pseudo echo signal generator 35, subtracts the pseudo echo signal SEI from the audio signal SM produced by the microphone 31, thereby suppressing the echo signal included in the audio signal SM, and puts out a resulting subtracted audio signal SMA. The subtracted audio signal SMA is put in to a subsidiary echo suppressor 38 and also to the adaptive filter 35. Accordingly, the adaptive filter 35 produces the pseudo echo signal SEI based on both the incoming audio signal SS to be fed to the speaker 32 and the subtracted audio signal SMA put out from the subtracter 37.

The subsidiary echo suppressor 38 has another input of an echo suppression degree signal SES produced by an echo suppression degree calculator 39, and it further suppresses a residual echo signal included in the subtracted audio signal SMA from the subtracter 37 in response to the echo suppression degree signal SES. An outgoing audio signal SMA' put out from the subsidiary echo suppressor 38, which is derived from the subtracted audio signal SMA with the residual echo signal suppressed, is sent out by a transmitter 40.

Circuit blocks including the subtracter 37, adaptive filter 35 and echo suppression degree calculator 39 constitute an embodiment of echo canceller set forth in claim 1 or claim 2. Circuit blocks including the subtracter 37, adaptive filter 35, echo suppression degree calculator 39 and subsidiary echo suppressor 38 constitute an embodiment of echo canceller set forth any of claim 1 through claim 4.

The adaptive filter 35 is made up of: a delay circuit including unit delay elements of n in number 41(0), 41(1), . . . , 41(a−1), 41(a), 41(a+1), . . . , 41(n−1) which are connected in series to delay in steps the incoming audio signal SS to be fed to the speaker 32; a factor generator 30 which produces factor signals h(0), h(1), . . . , h(a−1), h(a), h(a+1), . . . , h(n−1) of n in number, which vary in response to the subtracted audio signal SMA put out from the subtracter 37, factor registers of n in number 42(0), 42(1), . . . , 42(a−1), 42(a), 42(a+1), . . . , 42(n−1) which hold the respective factor signals, multipliers of n in number 43(0), 43(1), . . . , 43(a−1), 43(a), 43(a+1), . . . , 43(n−1) which implement multiplication between delayed audio signals x(0), x(1), . . . , x(a−1), x(a), x(a+1), . . . , x(n−1) of n in number produced by the respective unit delay elements and the factor signals h(0)-h(n−1) put out from the respective factor registers correspondingly; and a summing operator including adders of n−1 in number 44(1), . . . , 44(a−1), 44(a), 44(a+1), . . . , 44(n−1) which sum the multiplication outputs y(0), y(1), . . . , y(a−1), y(a), y(a+1), . . . , y(n−1) of the respective multipliers cumulatively.

The adders 44(1)-44(n−1) of the summing operator produce summation outputs z(1), . . . , z(a−1), z(a), z(a+1), . . . , z(n−1), respectively, of which the output z(n−1) of the last-stage adder 44(n−1) is released as the pseudo echo signal SEI. The pseudo echo signal SEI, i.e., summation output z(n−1), is the total of the multiplication outputs y(0)-y(n−1).

Figure 8:
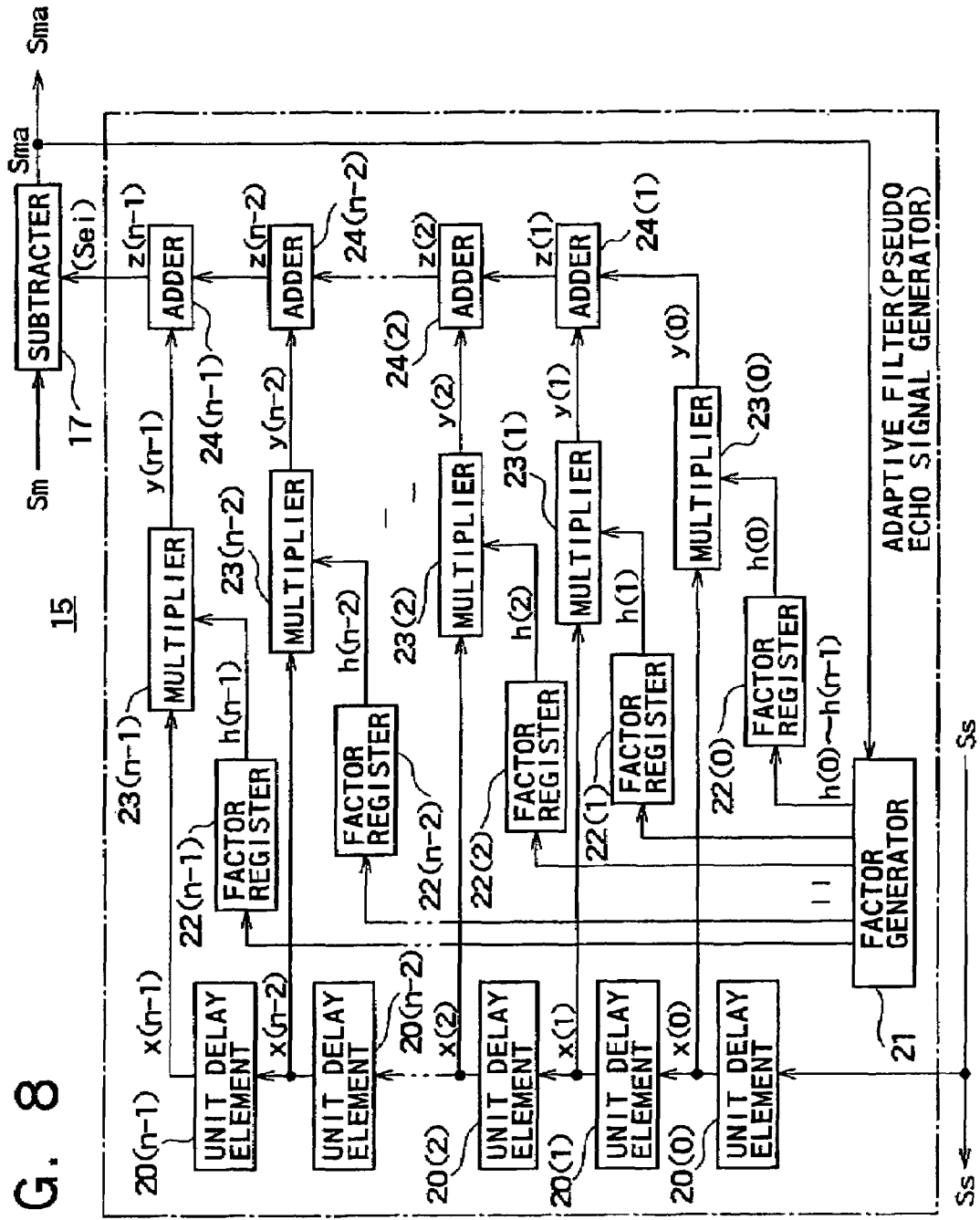
FIG. 8 is a block circuit diagram showing the adaptive filter as pseudo echo signal generator and the subtracter in the echo canceller shown in FIG. 7.
Figure 9:
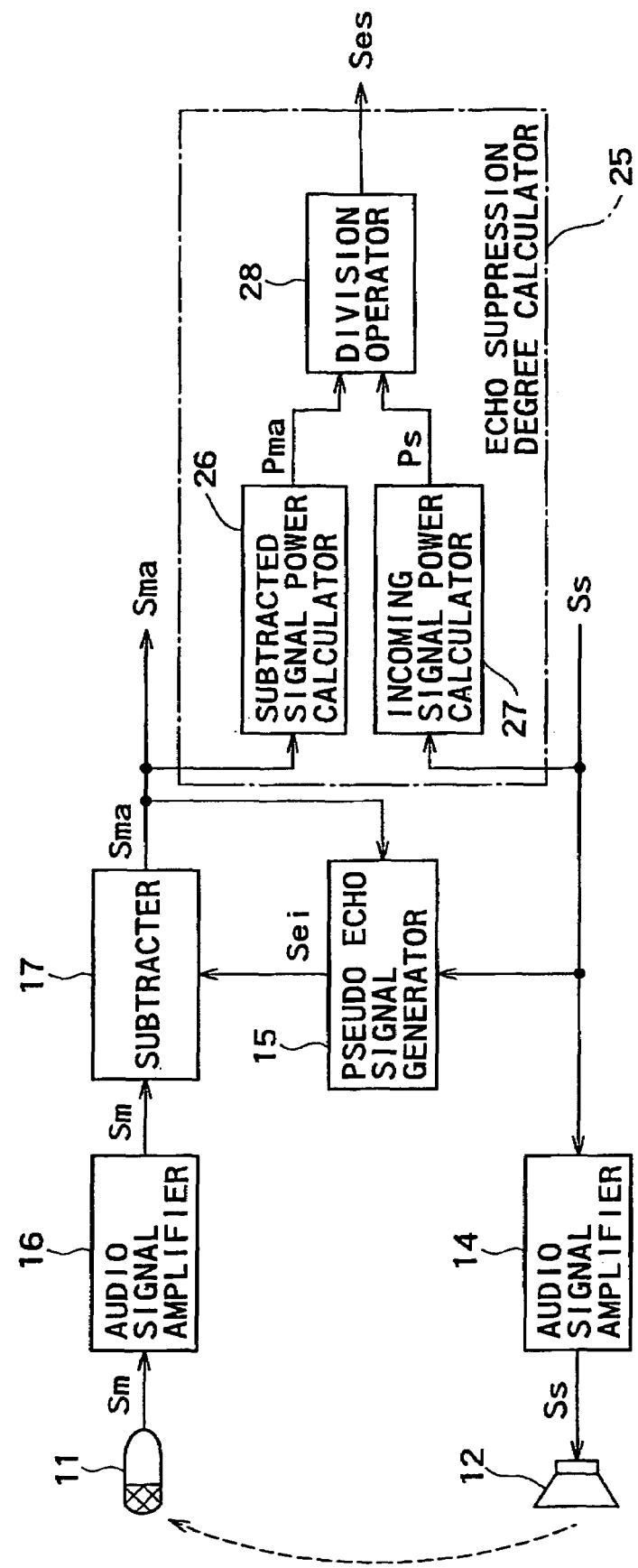
FIG. 9 is a block circuit diagram used to explain a conventional echo suppression degree calculator.

The factor generator 30 implements a learning-based revision process for the factor signals h(0)-h(n−1) based on the NLMS algorithm for example, and the signals are updated in the same manner as the adaptive filter of the conventional pseudo echo signal generator 15 shown in FIG. 8.

The echo suppression degree calculator 39 is made up of: squaring operators of n−a in number 45(a), 45(a+1), . . . , 45(n−1) which have inputs of the factor signals h(a)-h(n−1) from the factor registers 42(a)-42(n−1), which are also put in to the multipliers 43(a)-43(n−1) in the adaptive filter 35, and square these inputs to produce squared signals sh(a), sh(a+1), . . . , sh(n−1); and adders of n−a−1 in number 46(a+1), . . . , 46(n−1) which sum the squared outputs sh(a)-sh(n−1) of the respective squaring operators 45(a)-45(n−1) cumulatively.

The adders 46(a+1)-46(n−1) produce summation output signals e(a+1), . . . , e(n−1), respectively, of which the output signal e(n−1) of the last-stage adder 46(n−1) is released as the echo suppression degree signal SES. The echo suppression degree signal SES, i.e., summation output e(n−1), is the total of the squared signals sh(a)-sh(n−1).

The factor signals h(a)-h(n−1), which are put in to the respective squaring operators 45(a)-45(n−1) in the echo suppression degree calculator 39, are correspondent to delayed audio signals x(a)-x(n−1) produced by the unit delay elements 41(a)-41(n−1) of n−a in number out of the n-stage unit delay elements 41(0)-41(n−1) of the delay circuit in the adaptive filter 35. These unit delay elements ranging from an intermediate stage 41(a) through the last stage 41(n−1) are determined such that, for example, the impulse response of acoustic coupling between the speaker 32 and the microphone 31 having reverberation times equivalent to the delay times of the intermediate-stage unit delay element 41(a) through the last-stage unit delay element 41(n−1), i.e., power of the echo signal response included in the audio signal SM from the microphone 31, is virtually equal to the impulse response of acoustic coupling between the speaker 32 and the microphone 31 having reverberation times which are in excess of the delay time at the last-stage unit delay element 41(n−1), i.e., power of the echo signal response included in the audio signal SM from the microphone 31.

The following contemplates the determination of the range from an intermediate-stage unit delay element 41(a) through the last-stage unit delay element 41(n−1).

The impulse response of acoustic coupling between the speaker 32 and the microphone 31, i.e., the level LE of the echo signal included in the audio signal SM from the microphone 31 at time t is expressed by the following formula (2), with the reverberation time T being defined to be the time point at which the level LE falls to −60 dB of the initial value.

$$LE=\exp(-6.9t/T) \quad (2)$$

Accordingly, the level LE of an echo signal having a reverberation time T of T1 is expressed by the following formula (3), and the level LE of an echo signal having a reverberation time T of T2 (T2>T1) is expressed by the following formula (4).

$$LE=\exp(-6.9t/T1) \quad (3)$$

$$LE=\exp(-6.9t/T2) \quad (4)$$

Figure 3:
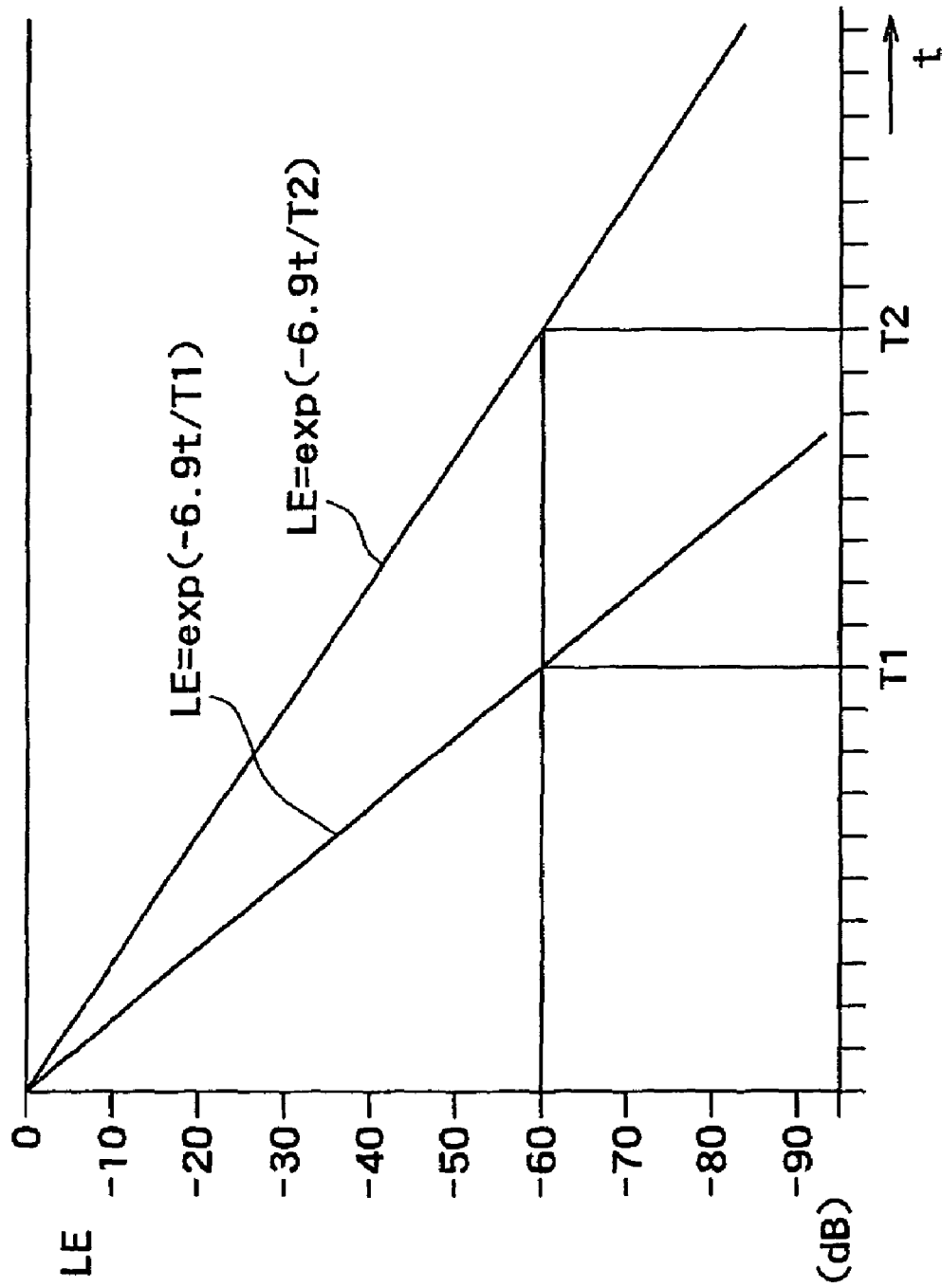
FIG. 3 is a characteristic graph used to explain the echo signal which is suppressed by the echo canceller shown in FIG. 1 and FIG. 2.

These echo signals have their levels LE varying with time as shown in FIG. 3.

Figure 4:
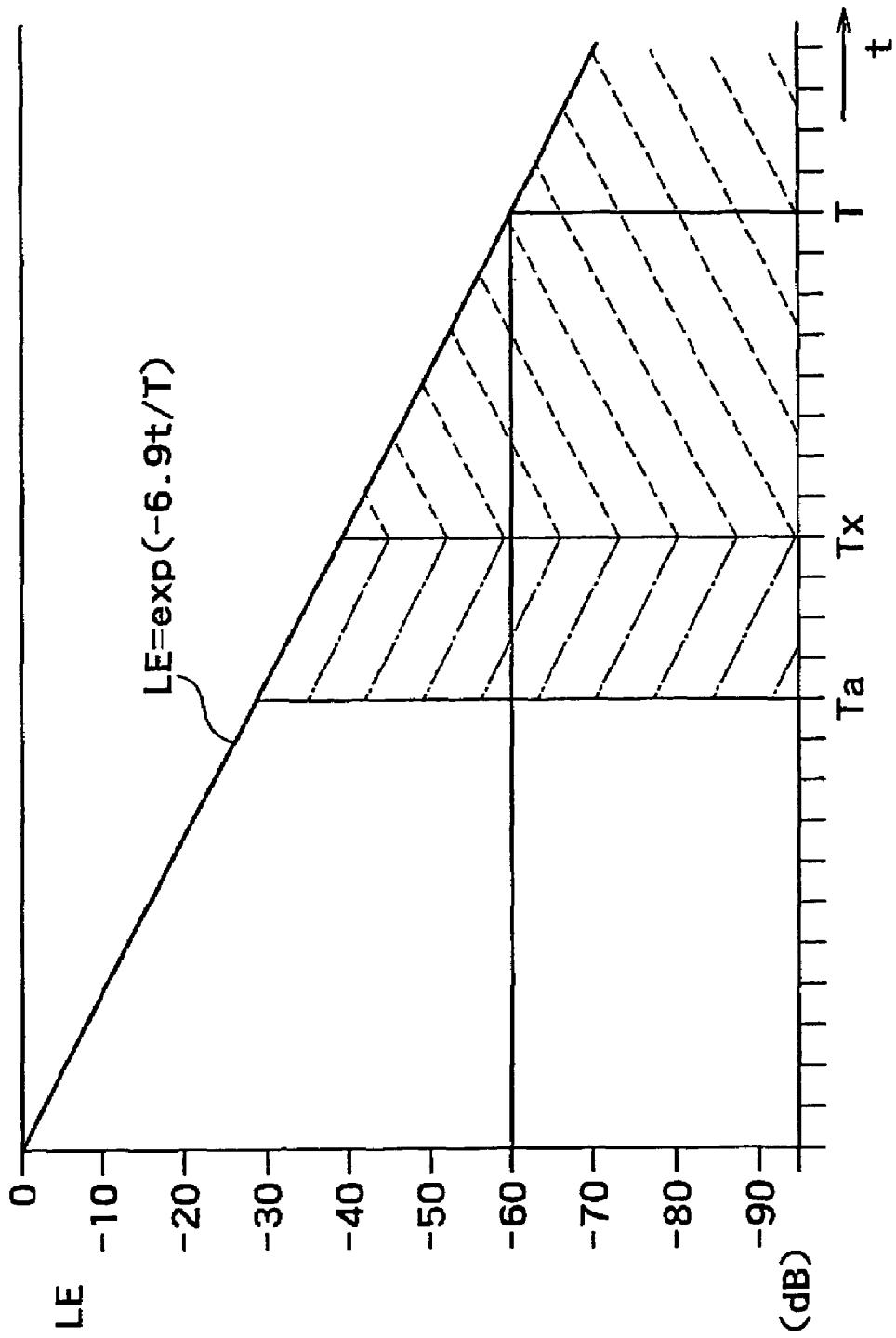
FIG. 4 is a characteristic graph used to explain the adaptive filter in the echo canceller shown in FIG. 1 and FIG. 2.

For the delay circuit of the adaptive filter 35 having a delay time of Tx at the last-stage unit delay element 41(n−1) and a delay time of Ta (Ta<Tx) at the intermediate-stage unit delay element 41(a), the level LE=exp(−6.9t/T) of the echo signal having a reverberation time T and the time points t=Ta and t=Tx are related as shown in FIG. 4.

Due to the delay time Tx of the last-stage unit delay element 41(n−1) in the delay circuit of the adaptive filter 35, the pseudo echo signal SEI produced by the adaptive filter 35 is designed to have a maximum value of reverberation time of Tx. Accordingly, only echo signals in audio signal SM having reverberation times of Tx or smaller are suppressed by the subtracter 37 by use of the pseudo echo signal SEI, and those having reverberation times in excess of Tx are not suppressed by the subtracter 37, but remain as a residual echo signal in the subtracted audio signal SMA put out from the subtracter 37. Assuming that echo signal having reverberation times of Tx or smaller are suppressed completely by the pseudo echo signal SEI, only echo signals having reverberation times in excess of Tx remain in the subtracted audio signal SMA put out from the subtracter 37.

In FIG. 4, the area hatched by dashed lines represents power of echo signal with reverberation times in excess of Tx which are not suppressed by the subtracter 37 by use of the pseudo echo signal SEI, and this power Px is expressed by the following formula (5).

$$Px = \int_{Tx}^{\infty} \exp(-6.9\ t/T) \cdot \exp(-6.9\ t/T)\, dt \quad (5)$$

In FIG. 4, the area hatched by dash-dot lines represents power of echo signal with reverberation times ranging from Ta to Tx, and this power Pax is expressed by the following formula (6).

$$Pax = \int_{Ta}^{Tx} \exp(-6.9\ t/T) \cdot \exp(-6.9\ t/T)\, dt \quad (6)$$

Due to the determination of an intermediate delay stage in the delay circuit of the adaptive filter 35 so that power of echo signal in audio signal SM having reverberation times equivalent to the delay times of the intermediate-stage unit delay element 41(a) through the last-stage unit delay element 41(n−1) and power of echo signal in audio signal SM having reverberation times in excess of the delay time at the last-stage unit delay element 41(n−1) are virtually equal as mentioned previously, the power Px expressed by formula (5) and the power Pax expressed by formula (6) are equal. Accordingly, the relation of the following formula (7) holds.

$$\int_{TX}^{\infty} \exp(-6.9\ t/T) \cdot \exp(-6.9\ t/T)\, dt = \quad (7)$$
$$\int_{Ta}^{Tx} \exp(-6.9\ t/T) \cdot \exp(-6.9\ t/T)\, dt$$
$$\int_{Tx}^{\infty} \exp(-13.8\ t/T)\, dt = \int_{Ta}^{Tx} \exp(-13.8\ t/T)\, dt$$
$$(-T/13.8) \cdot [0 - \exp(-13.8 Tx/T)] =$$
$$(-T/13.8) \cdot [\exp(-13.8 Tx/T) - \exp(-13.8 Ta/T)]$$
$$-\exp(-13.8 Tx/T) = \exp(-13.8 Tx/T) - \exp(-13.8 Ta/T)$$
$$\exp(-13.8 Ta/T) = 2 \cdot \exp(-13.8 Tx/T)$$
$$-13.8 Ta/T = \ln 2 - 13.8 Tx/T$$
$$Ta = (-T/13.8) \cdot (0.693 - 13.8 Tx/T)$$
$$Ta = Tx - (0.693/13.8) \cdot T$$
$$= Tx - 0.05 \cdot T$$

Based on this evaluated relation of Ta and Tx, an intermediate-stage unit delay element 41(a) having its delay time Ta equal to Tx−0.05T is selected from among the unit delay elements in the delay circuit of the adaptive filter 35.

Since the adaptive filter 35 produces a pseudo echo signal SEI that is comparable to the echo signal having reverberation times of Tx or smaller included in the audio signal SM produced by the microphone 31, the square-sum of the factor signals h(0)-h(n−1) produced by the adaptive filter 35 indicates the ratio of power of the audio signal SM produced by the microphone 31 to power of the incoming audio signal SS fed to the speaker 32, and the summation output signal e(n−1), which is the sum of the squared signals sh(a)-sh(n−1) produced by the adder 46(n−1) in the echo suppression degree calculator 39, indicates the ratio of power of a residual echo signal remaining in the subtracted audio signal SMA put out from the subtracter 37 to power of the incoming audio signal SS fed to the speaker 32, i.e., the degree of echo suppression by the pseudo echo signal SEI. Therefore, the echo suppression degree signal SES which is the summation output signal e(n−1) of the echo suppression degree calculator 39 represents accurately the degree of echo suppression by the pseudo echo signal SEI.

The echo suppression degree calculator 39 calculates the degree of echo suppression by implementing cumulative summing operations n−a times. For a sampling frequency of fs, it implements (n−a)·fs cumulative summing operations per second. However, it is sufficient to have such a calculation frequency of echo suppression degree as to keep up with the converging speed of the adaptive filter 35, instead of doing at each sampling, and therefore the frequency of calculation may be discounted expediently. Specifically, for example, for the calculation of echo suppression degree once a second, it is enough to implement n−a cumulative summing operations per second, which is significantly low in frequency as compared with 2n·fs cumulative summing operations per second of the NLMS-based adaptive filter 35 for example.

Figure 5:
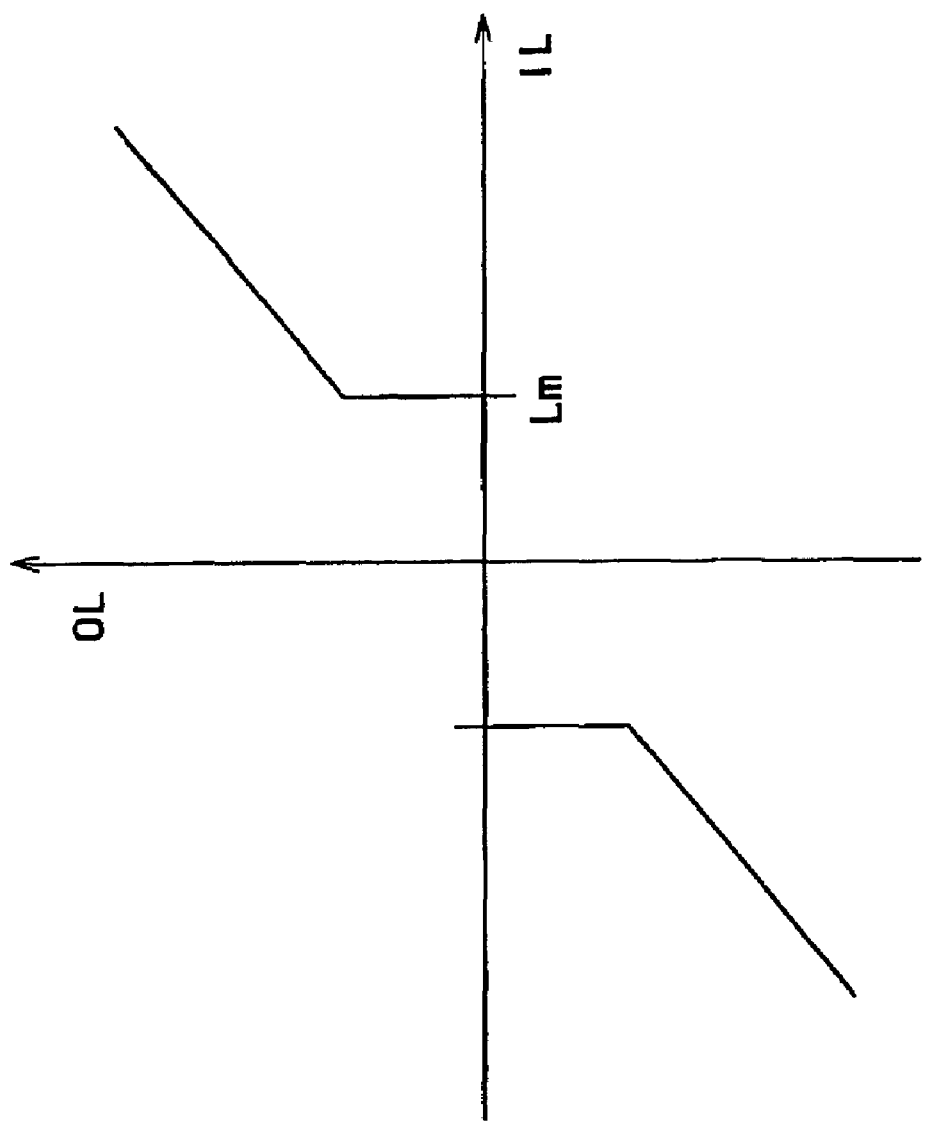
FIG. 5 is a characteristic graph used to explain the subsidiary echo suppressor in the echo canceller shown in FIG. 1 and FIG. 2.

The subsidiary echo suppressor 38, which further suppresses a residual echo signal included in the subtracted audio signal SMA from the subtracter 37 under control of the echo suppression degree signal SES produced by the echo suppression degree calculator 39, is designed to be a non-linear processing means having a transfer function between the input signal level IL and the output signal level OL as shown in FIG. 5 for example.

The nonlinear processing means as the subsidiary echo suppressor 38 implements a level control process in response to the echo suppression degree signal SES for the subtracted audio signal SMA from the subtracter 37. Specifically, if the subtracted audio signal SMA from the subtracter 37 is smaller than level Lm, the nonlinear processing means virtually disables the passage of the signal SMA and puts out a zero-level outgoing audio signal SMA'. If the subtracted audio signal SMA has a level of Lm or larger, the nonlinear processing means enables the passage of the signal SMA and puts out a significant outgoing audio signal SMA'. The threshold level Lm is determined by the following formula (8) for example.

$$Lm = g \cdot Qe \cdot Ps \quad (8)$$

where g is a constant, Qe is a degree of echo suppression indicated by the echo suppression degree signal SES, and Ps is power of the incoming audio signal SS fed to the speaker 32.

Based on the echo suppression degree which is calculated accurately in this manner and indicated by the echo suppression degree signal SES, the subsidiary echo suppressor 38 controls the subtracted audio signal SMA from the subtracter 37, thereby alleviating the echo, and releases the echo-free outgoing audio signal SMA'.

Figure 6:
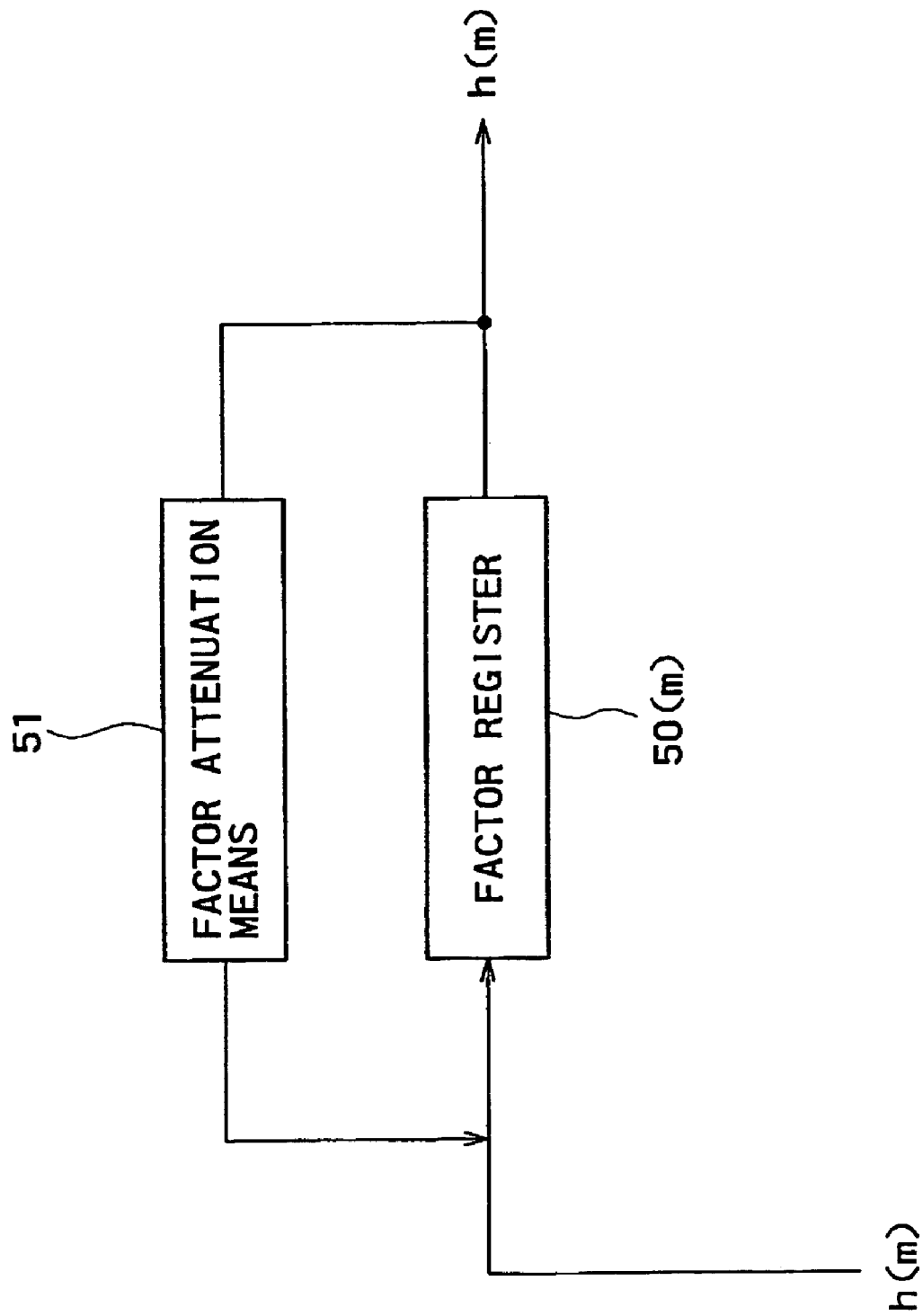
FIG. 6 is a block circuit diagram showing the factor register means used in the adaptive filter in an embodiment of echo canceller set forth in claim 2 or claim 4.
Figure 7:
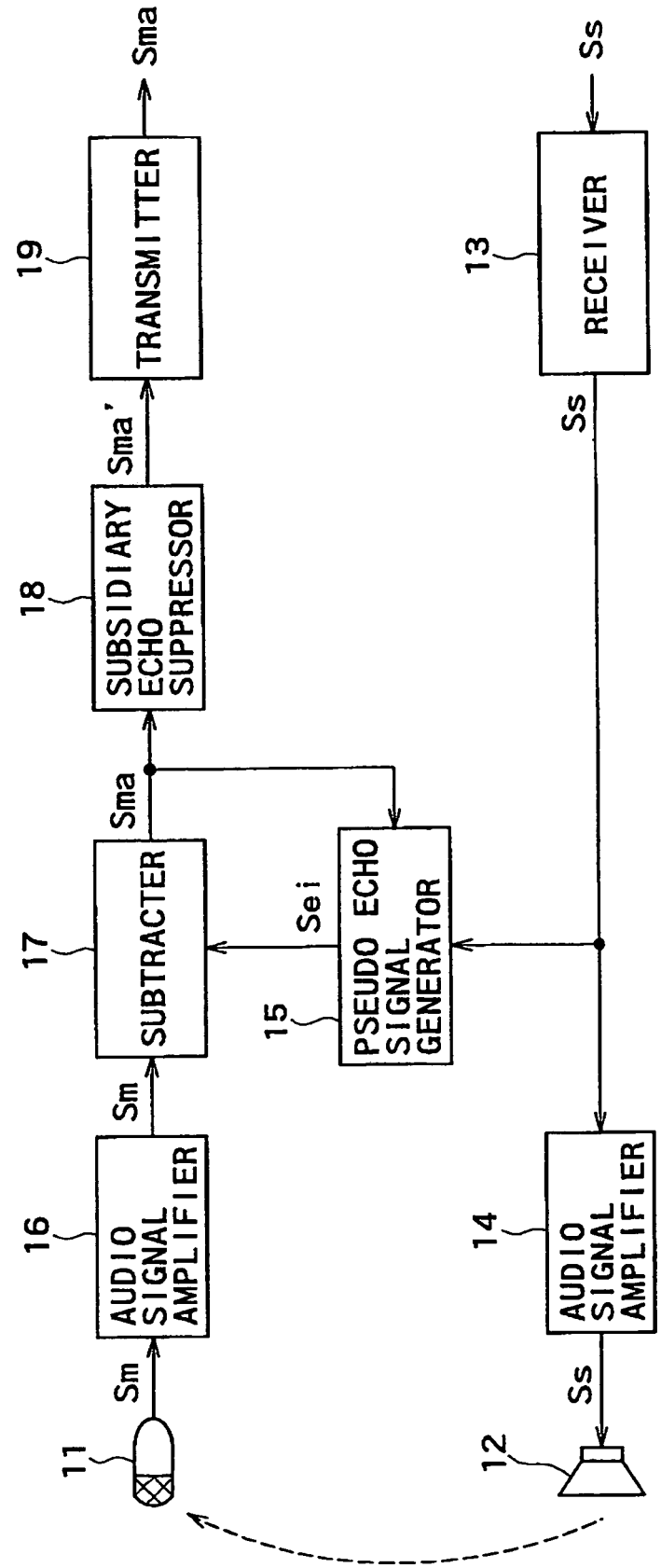
FIG. 7 is a block circuit diagram showing part of a vocal information exchange system, with a conventional echo canceller being applied thereto.

FIG. 6 shows a factor register means used in the adaptive filter of the embodiment of echo canceller set forth in claim 2 or claim 4.

The echo canceller of claim 2 or claim 4 has its other portions of adaptive filter and overall remaining sections arranged identically to the embodiment of echo canceller shown in FIG. 1 and FIG. 2 and set forth in claim 1 or claim 2, or the embodiment of echo canceller set forth in any of claim 1 through claim 4.

The factor register means shown in FIG. 6 is made up of a factor register 50(m) which is comparable to each of the factor registers 42(a)-42(n–1) of the adaptive filter 35 shown in FIG. 2, and a factor attenuator means 51 connected to the register 50(m). The factor register 50(m) receives and holds a factor signal h(m) which is comparable to each of the factor signals h(a)-h(n–1) treated in the adaptive filter 35 shown in FIG. 2.

The factor signal h(m) held by the factor register 50(m) is put in to the factor attenuator means 51, which decreases the value of factor signal h(m) and returns to the factor register 50(m), which then replace the old factor signal h(m) with the decreased factor signal.

The factor register 50(m) and factor attenuator means 51 operate cyclically at prescribed intervals. Consequently, the factor signal h(m) put out from the factor register 50(m) decreases in value progressively.

The factor register means shown in FIG. 6 is used in an adaptive filter comparable to the adaptive filter 35 shown in FIG. 2 in place of the factor registers 42(a)-42(n–1) of the adaptive filter 35 shown in FIG. 2 which hold the factor signals h(a)-h(n–1) to be put in to the squaring operators 45(a)-45(n–1) in the echo suppression degree calculator 39 among the factor registers 42(0)-42(n–1). Namely, the factor register means shown in FIG. 6 is used to hold the factor signals that correspond to the delayed audio signals to be put in to the unit delay elements ranging from an intermediate stage through the last stage in an adaptive filter equivalent to the adaptive filter 35 shown in FIG. 2 and put the held factor signals in to the multipliers of the adaptive filter and the squaring operators of an echo suppression degree calculator comparable to the echo suppression degree calculator 39 shown in FIG. 2.

In the embodiment of echo canceller having the factor register means shown in FIG. 6 set forth in claim 2 or claim 4, the echo suppression degree calculator can produce an echo suppression degree signal quickly and accurately based on the factor signals which decrease in value progressively, even in case the factor signals put out from the adaptive filter deviate from the ideal values due to the variation of acoustic coupling between the speaker as signal/sound transducing means and the microphone as sound/signal transducing means or due to other disturbances.

As described above, according to an inventive echo canceller set forth in any of claim 1 through claim 4, which is used in a vocal information exchange system in which a sound/signal transducing means, e.g., microphone, has an output of a first audio signal and a signal/sound transducing means, e.g., speaker, has an input of a second audio signal, an adaptive filter produces a pseudo echo signal based on the second audio signal, a subtracter subtracts the pseudo echo signal produced by the adaptive filter from the first audio signal thereby to implement echo suppression based on the second audio signal and puts out a resulting third audio signal, an adaptive filter delays the second audio signal in steps by means of a plurality of delay stages and also generates factor signals, and an echo suppression degree calculator implements squaring operations for factor signals that correspond to delayed audio signals put out from an intermediate through the last delay stages and sums the squared signals thereby to produce the echo suppression degree signal.

The range of delay stages from an intermediate through the last stages which put out delayed audio signals to be used for producing the echo suppression degree signal by the echo suppression degree calculator is determined such that, for example, power of the echo signal response included in the first audio signal having reverberation times equivalent to delay times of the intermediate through the last delay stages is virtually equal to power of the echo signal response included in the first audio signal having reverberation times in excess of the delay time at the last delay stage. Consequently, the echo suppression degree signal produced by the echo suppression degree calculator indicates accurately the echo suppression degree for the first audio signal achieved by use of the pseudo echo signal produced by the adaptive filter.

According to an inventive echo canceller set forth in any of claim 1 through claim 4, a subtracter implements echo suppression for a first audio signal based on a pseudo echo signal produced by an adaptive filter and puts out a resulting third audio signal, and an echo suppression degree calculator calculates accurately the degree of echo suppression achieved by use of the pseudo echo signal.

According to an inventive echo canceller set forth in claim 3 or claim 4, a subsidiary echo suppressor processes the third audio signal, which results from echo signal suppression for the first audio signal by the subtracter, in response to an echo suppression degree signal calculated accurately by an echo suppression degree calculator for the degree of echo suppression achieved by use of the pseudo echo signal produced by the adaptive filter. Consequently, a residual echo signal included in the third audio signal is suppressed accurately and effectively.

The foregoing invention has been described in terms of preferred embodiments. However, those skilled, in the art will recognize that many variations of such embodiments exist. Such variations are intended to be within the scope of the present invention and the appended claims.

What is claimed is:

1. An echo canceller comprising:
   a subtracter for producing a subtracted audio signal by subtracting a pseudo echo signal from an audio signal to be transmitted;
   a psuedo echo signal generator generating said pseudo echo signal from a received audio signal using an adaptive filter having tap factors generated from said subtracted audio signal;
   an echo suppression degree calculator for generating a subsidiary echo suppression degree signal based on said tap factors,
   wherein the echo suppression degree calculator performs a first squaring operation on an intermediate tap factor of the adaptive filter and a second squaring operation on a last tap factor of said adaptive filter; and
   a subsidiary echo suppressor for suppressing echo in said subtracted audio signal using said subsidiary echo suppression degree signal.

2. The echo canceller according to claim 1,
   wherein said subsidiary echo suppression degree signal is based on said tap factors from an intermediate-stage through a last-stage.

3. The echo canceller according to claim 1,
   wherein said echo suppression degree calculator includes:
   tap factor operation means for squaring values of the tap factor of said adaptive filter; and
   summing means for summing the outputs of said tap factor operation means.

* * * * *